United States Patent [19]

Stein

[11] Patent Number: 5,519,770
[45] Date of Patent: May 21, 1996

[54] ENHANCED TELEPHONY APPARATUS AND SYSTEM

[75] Inventor: Calvin J. Stein, Turramurra, Australia

[73] Assignee: Australian and Overseas Telecommunications Corporation Limited, Sydney, Australia

[21] Appl. No.: 965,407
[22] PCT Filed: Jun. 24, 1991
[86] PCT No.: PCT/AU91/00268
§ 371 Date: Feb. 16, 1993
§ 102(e) Date: Feb. 16, 1993
[87] PCT Pub. No.: WO92/00642
PCT Pub. Date: Jan. 9, 1992

[30] Foreign Application Priority Data

Jun. 26, 1990 [AU] Australia ................. PK0834

[51] Int. Cl.$^6$ .............. H04M 3/42; H04M 7/00
[52] U.S. Cl. .......... 379/201; 379/207; 379/211; 379/216; 379/221; 379/230
[58] Field of Search ................ 379/201, 207, 379/210, 211, 219, 220, 221, 230, 67, 88, 89, 212, 214, 216

[56] References Cited

U.S. PATENT DOCUMENTS

| | | | |
|---|---|---|---|
| 3,668,317 | 6/1972 | Vitalo | 179/18 BF |
| 4,054,756 | 10/1977 | Comella et al. | 379/89 |
| 4,162,377 | 7/1979 | Mearns | 379/230 X |
| 4,232,199 | 11/1980 | Boatwright | 379/197 |
| 4,310,727 | 1/1982 | Lawser | 379/230 X |
| 4,611,094 | 9/1986 | Asmuth et al. | 379/201 |
| 4,653,085 | 3/1987 | Chan et al. | 379/94 |
| 4,661,975 | 4/1987 | Brecher | 379/215 |
| 4,706,280 | 11/1987 | Barbare et al. | 379/284 |
| 4,876,711 | 10/1989 | Curtin | 379/94 |
| 4,878,240 | 10/1989 | Lin et al. | 379/67 |
| 4,879,743 | 11/1989 | Burke et al. | 379/214 X |
| 5,012,511 | 4/1991 | Hanle et al. | 379/88 X |
| 5,117,451 | 5/1992 | Ladd et al. | 379/214 X |
| 5,237,604 | 8/1993 | Ryan | 379/207 X |
| 5,251,255 | 10/1993 | Epley | 379/207 X |
| 5,255,315 | 10/1993 | Bushnell | 379/207 X |

FOREIGN PATENT DOCUMENTS 2114398 8/1983 United Kingdom.

Primary Examiner—James L. Dwyer
Assistant Examiner—Harry S. Hong
Attorney, Agent, or Firm—Baker & Daniels

[57] ABSTRACT

An enhanced services unit for connection to existing exchanges is described. The unit is connected via an exchange emitting CCITT common channel signaling system #7 (CCSS#7) trunk connections to an existing exchange and is viewed by the exchange as another exchange. The unit may control switching via re-entrant trunks on the main exchange. Services are software defined and may be configured to suit particular customers. An advantageous implementation of the message transfer part of CCSS#7 is also described.

8 Claims, 9 Drawing Sheets

ENHANCED TELEPHONY APPARATUS AND SYSTEM

FIELD OF INVENTION

This invention relates to an improved apparatus and system for providing enhanced telephony services, and a method for providing these services.

BACKGROUND

Enhanced telephony services are services provided on publicly accessible networks in addition to party-party calls, such as conference calls, call diversion, re-routing of calls and similar services. A particular difficulty with offering these services is the need to identify customers, and to recognise which service is required and to effect that particular customer's variation of the service.

Conventionally, such services are offered by replacing or reconfiguring the entire exchange. This is expensive, and generally produces a comparatively inflexible end result. Further, such services do not allow the possibility of the users themselves defining the services they require, nor generally such options as virtual private networks, closed user groups and dynamic detailed usage reports.

Prior art services which provide other than party-party calls on the PSTN have generally been rigid in services provided, alternative arrangements, and billing techniques. U.S. Pat. No. 3,668,317 to Vitalo describes a paging service which operates using a telephone number. This number only operates the paging service. Calling the number will then activate a pager and advise the caller that the customer has been paged. Only the called party could be billed for this service.

SUMMARY OF THE INVENTION

It is an object of the present invention to provide an apparatus which can be connected to an existing exchange without significant modification of the exchange and provide enhanced telecommunications services.

According to one aspect, the present invention comprises an improved communications system for providing customer specified services, comprising in combination:

a telephone exchange including switching means adapted to switch calls according to a switching protocol which preferably includes means identifying the origin of calls, said exchange including re-entrant trunks and means for communicating with other exchanges; and enhanced telephony means in communication with said exchange and including memory means for storing enhanced service instructions, processing means for performing enhanced services instructions and interfacing means for communicating with said exchange, wherein said exchange communicates with said enhanced telephony means as if said enhanced telephony means is another exchange, and said enhanced telephony means is operatively enabled to re-route calls received by said exchange using said re-entrant trunks.

According to a further aspect the present invention comprises a method for providing enhanced telephony services, in a network comprising a plurality of customer lines, one or more exchanges, and an enhanced telephony unit connected by trunk lines to one of said exchanges, wherein (a) a predefined number is called from one of said subscriber lines;

(b) said one exchange receives said call request and switches it to said enhanced telephony unit;

(c) said enhanced telephony unit compares the called number with a stored table of instructions, and causes said exchange to make at least one further call request in accordance with said instructions; and (d) providing an enhanced telephony service in respect of said call.

BRIEF DESCRIPTION OF DRAWINGS

Further details of this invention will become apparent from the following description of one embodiment with reference to the accompanying Figures, in which.

DESCRIPTION OF PREFERRED EMBODIMENT

Figure 1:
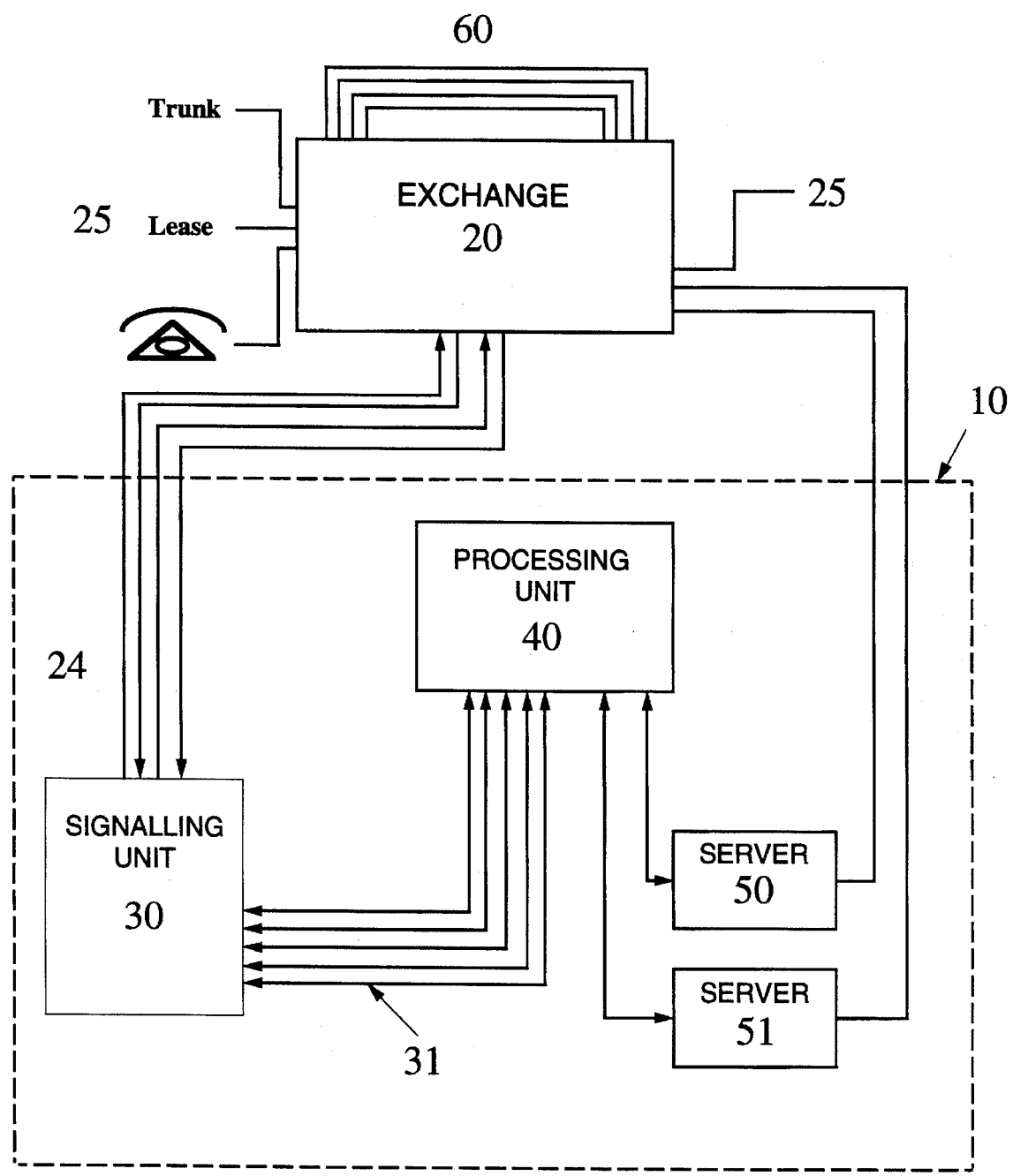
FIG. 1 is a schematic block diagram illustrating an overview of the present invention.

According to this invention, enhanced telephony functions are provided by a stand-alone unit, ETU 10, which is connected to an exchange 20 as can be seen from FIG. 1. The illustrated system is known as SCANTS. Communications between ETU 10 and exchange 20 are conducted in a communications protocol such that the ETU appears to the exchange 20 as if it were simply another exchange. ETU 10 may be also connected to other systems, e.g. ISDN, X25 links, other databases, or other ETUs.

The embodiment is described with reference to exchanges implementing CCITT Common Channel Signalling System # 7 (CCSS#7). It should be understood that the invention as described should be read in association with the relevant CCITT specifications, in particular Q701 to Q709 dealing with the message transfer part (MTP), Q721 to Q725 dealing with the telephone user part (TUP), and the ISUP recommendations if required. It will be appreciated moreover that the present invention may be implemented for any signalling system wherein call origin information may be derived from the signalling information.

In order for the described embodiment to operate with existing exchange switches, the switches should comply with the following requirements:

CCSS#7 signalling with international TUP

A 'signalling point code' for SCANTS

At least one signalling link to SCANTS (Preferably two links)

Ability to designate circuits as being 'calls from the switch' and 'calls to the switch'

Ability to suppress continuity checking of SCANTS calls

Ability to use enblock sending of digits

Ability to use 'option 1' of the RED book for circuit group supervision messages (CCITT RED BOOK Q723 para 3.10 option (a) (i) and (d) (i))

Ability to send a GRQ (General Request) after receiving an IAM (Initial Address Message) (for transfer of CLI (Calling Line Identity))

Ability to receive and interpret a GSM (General Status Message) (for transfer to CLI)

Ability to respond to a received GRQ with a GSM (for transfer of CLI)

Ability to route to SCANTS for certain B number prefixes

Ability to strip off the DCD prefix from SCANTS (SCANTS can use a multi-digit DCD)

Ability to log the DCD, B number, and CLI received from SCANTS into the TCDP record.

The ETU 10 comprises 3 principal hardware components—processing unit 40, signalling unit 30, and servers 50, 51. It will be apparent that the number of servers may be varied as required by the system.

Processing unit 40 is preferably a SUN-386i workstation including 8 Mb RAM, 327 Mb hard disk, and appropriate interfacing and peripheral devices. It carries out various operations under the direction of software which will be described in more detail below.

Signalling unit 30 provides appropriate communications to and from exchange 20, such that the exchange 20 sends and receives CCSS#7 messages as if it were talking to another exchange. Signalling unit 30 handles all routine network maintenance functions and reports on network status to the processing unit 40.

Servers 50, 51 communicate with the customer in order to obtain information such as credit card numbers, customer identification and password access code using, either voice or DTMF. This information is relayed to the processing unit 40. Servers 50, 51 also provide services such as voice announcements to be played to customers as required.

It will be noted that exchange 20 may have a variety of inputs 25 including the Public Switched Telephone Network (PSTN), trunks, leased lines and other exchanges.

It should be appreciated that unless some service provided or controlled by ETU 10 is invoked, exchange 20 operates in a conventional manner, switching an input to an output defined by pulse/tone coding or inter-exchange signalling as is well known.

Figure 2:
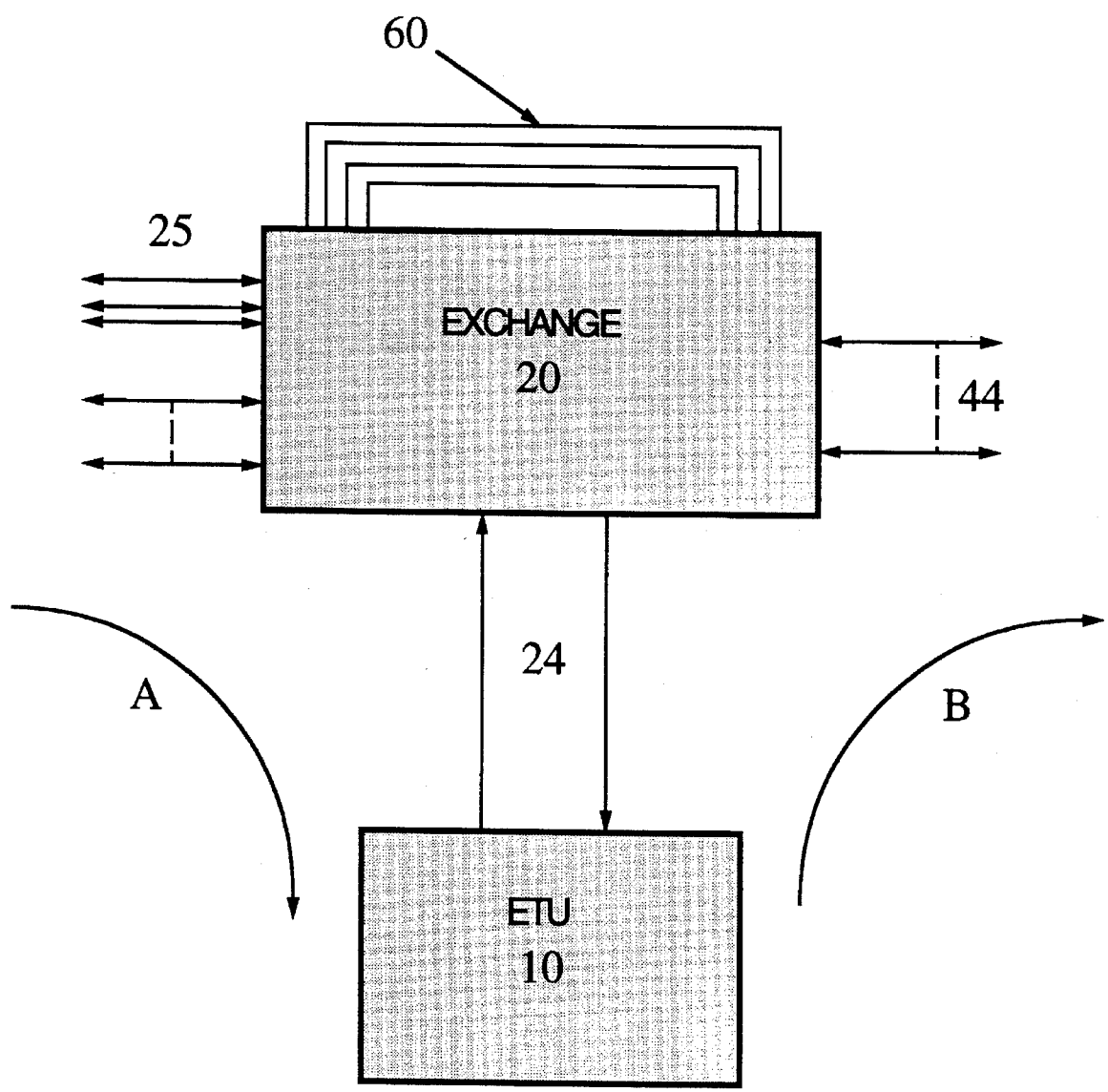
FIG. 2 illustrates the call procedure via the present invention.

Referring to FIG. 2, call progress using the present embodiment is illustrated schematically. ETU 10, it is emphasised, does not act or appear on the network as a mere translation exchange. It acts as a signalling endpoint in its own right, and moreover indirectly controls switching in certain cases within the exchange itself. Re-entrant trunks 60 on exchange 20 are used to re-route calls by appearing to be separate outgoing and incoming trunk connections to exchange 20. Thus, a call from (for instance) a subscriber to another subscriber for which a service (for instance, time diversion defined by the receiving subscriber) is required proceeds as follows. The calling party makes what he believes is a call to his destination. However, he in fact makes call A, via the PSTN or lease and exchange 20 to ETU 10, the audio path being connected to a channel on re-entrants trunks 60. ETU 10 recognises what destination is required, and places call B to the defined number of the actual desired recipient using the corresponding channel on re-entrant trunk 60, thus establishing a link between the caller and receiver.

Conceptually, therefore, one "logical" call becomes two or more "physical" calls.

Depending on the service which is defined by the number called, and perhaps also by who the caller is, other functions may be performed. For example, If a fax store and forward service is used, ETU 10 may store the data in an associated memory device and send it later, as required; it may multicast the facsimile message to a variety of end receivers; or it may link several subscribers in a conference facility.

It is important to realise that exchange 20 need only be a conventional exchange. The exchange sends calls to ETU 10 as if it were merely another exchange, and accepts calls from it as if they are incoming calls from another exchange. The re-entrant trunks 60 operate such that exchange 20 believes it is making calls to other exchanges, and receiving incoming calls from other exchanges. This helps to minimise connections and circuit handling requirements from ETU 10.

PROCESSING UNIT

Processing unit 40 preferably uses an operating system such as UNIX. The software may be considered as having four distinct software processes running as described below.

Processing Unit 40 is preferably a SUN-386i workstation including 8 Mb RAM, 327 Mb hard disk, 3.5 inch floppy disk drive, expansion unit with 60 Mb cartridge tape drive, DigiCHANNEL Com/8i card (available from Digiboard Inc.), PC-Labcard (PCL 720) (available from Advantech Ltd.) and appropriate peripheral devices and cabling.

The Processing unit 40 runs following separate software processes which are responsible for the following aspects of the SCANTS system's operation:

L4MH (Level 4 Message Handler)

This software module is responsible for handling the communication between the Sun-386i and the signalling unit 30 (MTP). It uses a UNIX device driver to control the PCL-720 PC-Labcard. The PCL-720 PC-Labcard is the interface from the Sun-386i to the signalling unit. The primary functions of L4MH include the packing and unpacking of messages transferred between the processing unit 40 and the signalling unit 30, as well as message distribution.

CCON (Call Control)

CCON is responsible for call handling/control. It is an implementation of the 'CCITT Red Book Telephony User Part (TUP)', with additional modifications to support enhanced telephony services.

SSH (Special Services Handler)

SSH acts as the interface between CCON and the database. It provides the necessary functions and customer database information that CCON needs in order to process a call according to a customer's registration details. SSH is also responsible for server control and interaction.

ALARM (Alarmhandler)

ALARMHANDLER is a central alarmhandling process. It receives alarms from the other 3 processes, prioritises them and then records them in a log file. If a printer is available, ALARM will send a copy of the relevant alarm message to the printer. If the monitoring software SCON, is active, ALARM will send a copy of the alarm message to SCON, for display on the user's terminal.

ALARMHANDLER assigns priority values to each alarm message it receives. Priority values range from 1 (High) to 10 (Low). If the priority value of an alarm message is considered high enough, ALARM activates a physical alarm. This takes the form of closing the contacts of a relay, located inside the processing unit 40. The connections to this relay are available to the user.

Figure 5:
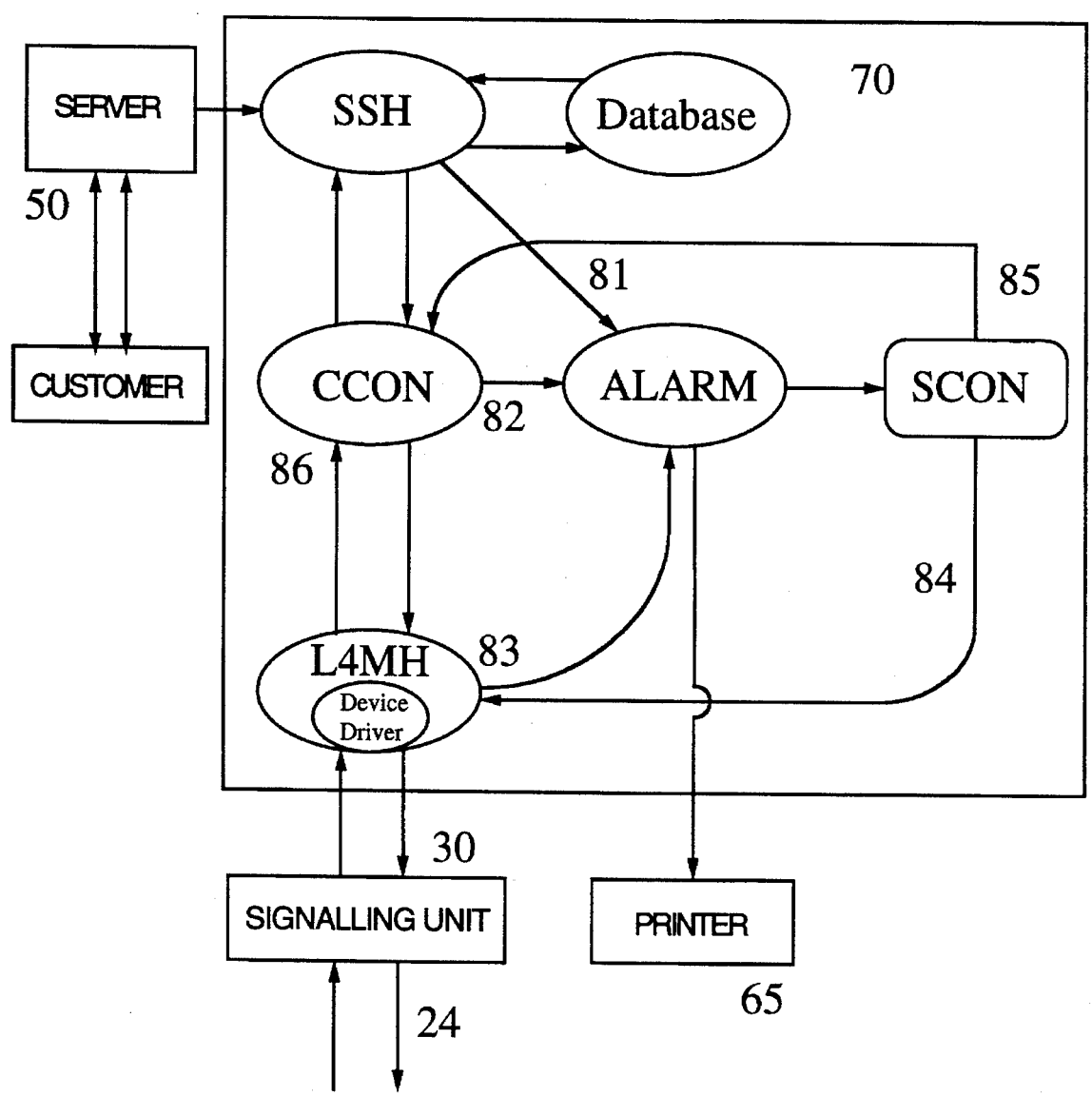
FIG. 5 illustrates in block form the interaction of various software modules.

These four processes communicate with each other via the standard UNIX Inter Process Communication (IPC) mechanism, known as message queues. FIG. 5 shows how these four processes interact with each other and with other system software and hardware.

SCON

SCON is an interactive program for the monitoring and control of signalling links, circuits and alarms within the illustrated embodiment. Through the preferred use of menus and window displays, it provides the user with a very easy to use control interface.

SCON performs six primary functions which allow the user to monitor and control signalling links, circuits and alarms. These functions are summarised below:

1. Allows the user to control and display the state of specific circuits.
2. Allows the user to send commands to the signalling unit 30.
3. Displays alarms, warnings and error messages.
4. Provides statistics on setup and operation.
5. Simulates the sending of CCSS#7 TUP messages.
6. Checks username with password to determine access to SCON options.

FIG. 5 shows how SCON interacts with the other SCANTS software and how messages are distributed between SCON and the other SCANTS processes.

DATABASE

The database contains tables of customer defined requirements which are consulted so as to provide the required enhanced services. The database is preferably based on Oracle software from Oracle Inc. It will be apparent to the reader that there are a variety of well-known software techniques which could be used to create a suitable database. A preferred embodiment includes at least the following elements:

The Customer Table stores customer details and indicates what service components the customer has registered for.

The CLI (Calling Line Identity) Table contains all the CLIs that correspond to a specific Billing ID (See below).

The Numbers Table stores the numbers that can be dialled or received, their abbreviations, possible extensions, translations and routing per TOD/DOW.

The Call Sequence Table (CST) stores the sequences for alternative destination attempts if the previous attempt was busy or unanswered.

The Limits Table stores any limitations that may be imposed on any customer.

The Service tables stores all the 'service' prefixes that identify the facility being requested by the caller.

The Server Table stores details of the available servers and their capabilities.

The DCD Table stores the identifiers used to distinguish between facilities of a service. This information is used for charging purposes only.

The Savenumbers Table is used to support the Follow Me service.

The tables are consulted when required and key indicators allow easy navigation through the tables and between the tables.

Servers 50, 51 are used to provide the inventive system with a flexible facility for automated customer interaction. Each server is configurable to traffic conditions, for up to 32 telephone channels. Each channel is controlled as a fully independent entity allowing simultaneous voice input/output or DTMF reception.

Servers are prefertable IBM PC-compatible PCs, and communicate with processing unit 40 via RS232 links. They preferably include a Dialogic D41 voice communications card (4 channels per card and VCS Telerec voice recognition card (1 channel per card).

THE MTP

The MTP, Message Transfer Part, of CCITT Signalling system no. 7, is responsible for the signalling network functions such as traffic control, routing of messages and maintenance of the signalling network.

The present invention utilises a special purpose signalling unit 30 to implement the MTP because of the high processing requirement. The signalling unit 30 communicates with the processing unit 40 via a high speed parallel bus 31. In this way the host is relieved of MTP processing which allows a lower cost and performance processing unit 40 to be used.

Figure 6:
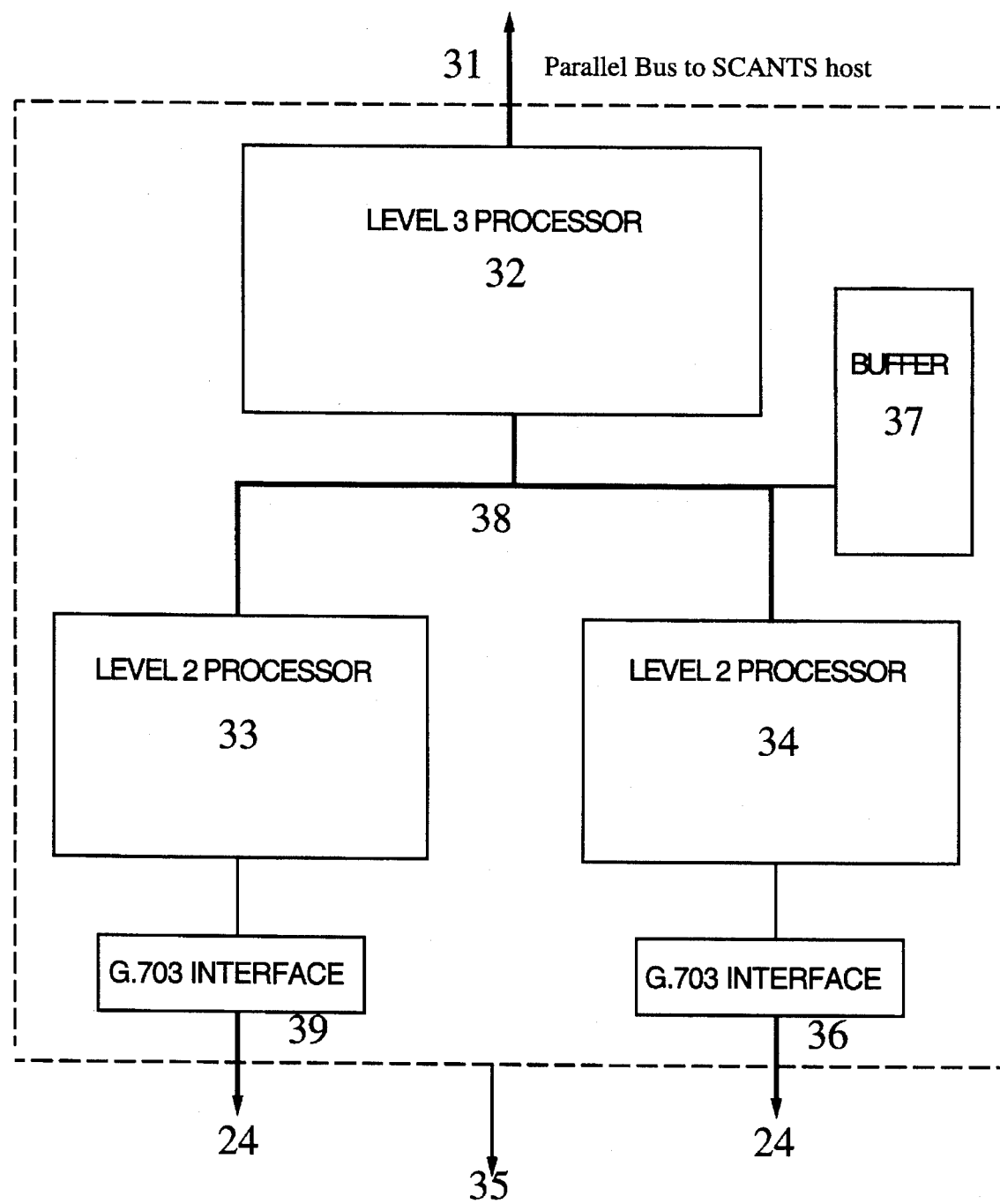
FIG. 6 is a block diagram of the MTP implementation.

FIG. 6 illustrates the hardware configurations of the level 2/level 3 subsystem (L2/L3) 35 of the signalling unit 30.

Level 3 processor 32 is connected by parallel bus 31 to the processing unit 40. This processor 32 is based upon a Motorola MVME 104 processor card and incorporates a 68010 CPU running at 10 Mhz and an I/0 channel interface. Communications with level 2 processors 33, 34 are via VMEbus 38. Each level 2 processor is based on a Motorola MVME 333-2 processor card incorporating a 68010 CPU running at 10 MHz, 68540 DMAC and Z8530 SCC.

Outputs from level 2 processors 33, 34 are output to 2 Mbps G. 703 interfaces 36, 39 and hence to exchange 20.

MTP SOFTWARE IMPLEMENTATION

The implementation of the MTP according to the present invention solves one of the intrinsic difficulties in the CCITT specification.

The CCITT specifications do not include implementation issues, however the interpretation of the specifications for the MTP has led to a distinction of where functions reside and therefore hints at implementation.

The particular area being referred to is the 'changeover and changeback of level 2 links'.

HOW THE LEVELS INTERACT

The level 3 entity has 'higher intelligence' than the level 2 in that level 2 is concerned only with transferring information as presented to it by level 3 to directly connected terminals, while level 3 is concerned with the delivery of messages to the specified destination no matter how many terminals the message passes through.

Level 3 is the 'superior' and 'supervisor' of level 2.

A level 3 entity would have many level 2 entities to supervise and will individually specify a level 2 entity for delivery of each message.

LEVEL 3 FUNCTIONS

The level 3 functionality of the MTP deals with the network functions such as how to route messages to particular destinations and how to maintain the network by ensuring that a path is always available to each destination.

Information messages are passed by a level 3 entity to a level 2 entity for delivery to a directly connected terminal. The level 2 entity at the receiving terminal will then pass the message to its own level 3 entity for processing.

The level 3 entity determines when to enable or disable a level 2 entity. This means that if a level 2 entity should fail, it will be the decision of the level 3 entity as to whether that particular level 2 entity should be re-enabled, or whether another level 2 entity should be enabled.

LEVEL 2 FUNCTIONS

The level 2 functionality of the MTP deals with the transfer of messages between directly connected terminals and ensures the error free delivery of the messages.

A level 2 entity has, in its own memory store the messages passed to it by the level 3 entity for delivery to the directly connected terminal.

CHANGEOVER AND CHANGEBACK

Since a level 2 entity has its own memory store of the messages given to it by level 3 for delivery, level 3 relies on level 2 to inform it of which messages have successfully been transferred.

If a level 2 entity should fail, then it is the responsibility of the level 3 supervisor to ensure that no messages are lost and undelivered messages by the failed level 2 are delivered by a different level 2 entity.

The level 3 entity therefore needs to retrieve all undelivered messages to pass them to a healthy level 2 entity.

However, should the level 2 entity not be able to even communicate with the level 3 entity then this information of untransferred messages will not be made available to the level 3 entity and information can be lost.

Figure 7A:
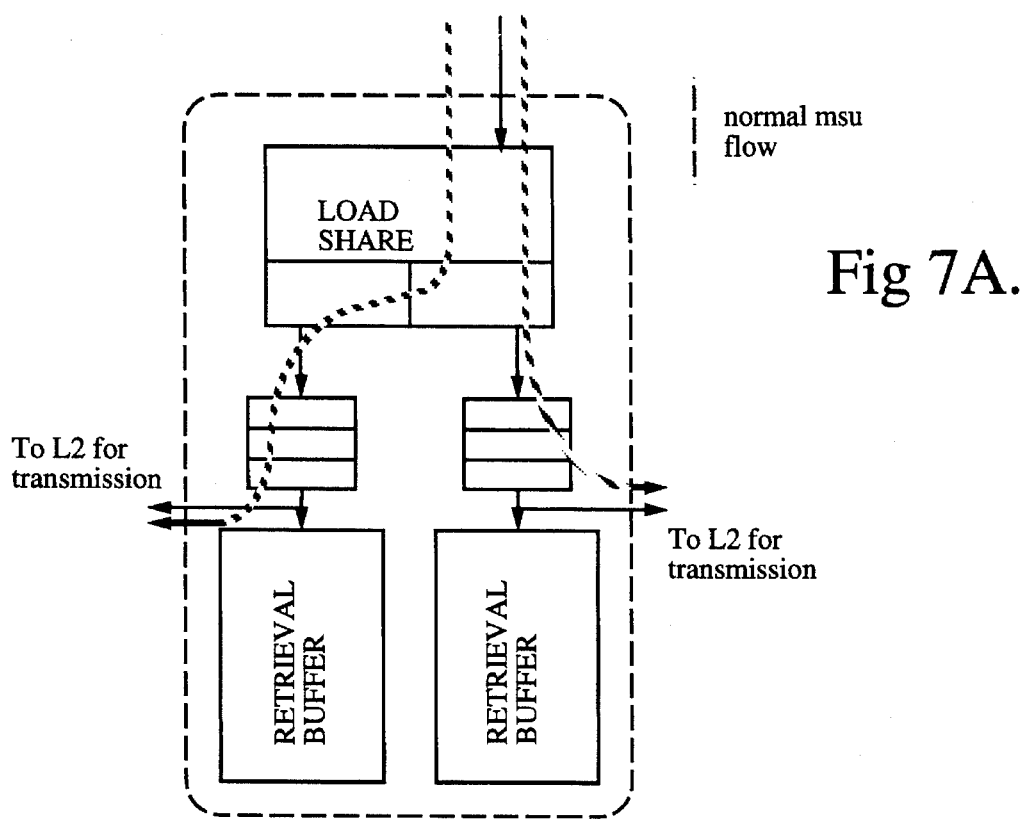
FIGS. 7A and 7B illustrate changeover procedures in the MTP implementation.
Figure 7B:
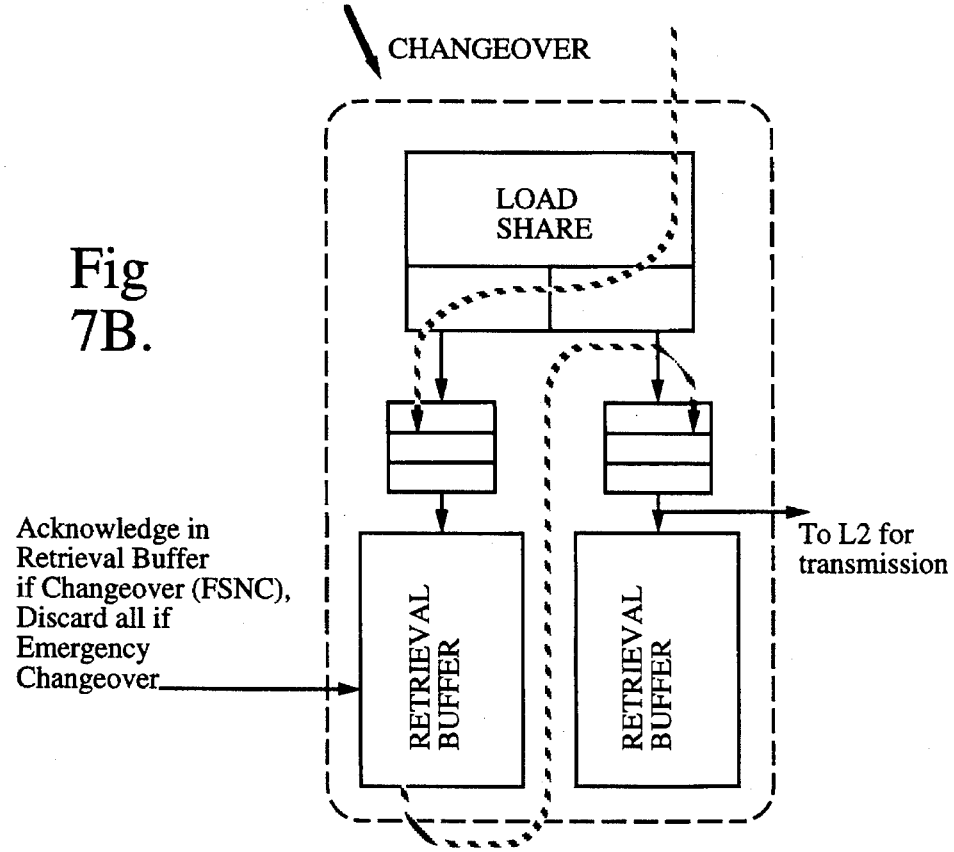

Referring to FIGS. 7A and 7B, according to the present invention the level 3 entity also takes part in the acknowledge mechanism that occurs between the level 2 entities to confirm receipt of a message.

The level 3 entity also retains its own copies of the messages given to each level 2 entity to deliver.

In this way when a level 2 entity fails, the level 3 supervisor will still have copies of the unacknowledged (undelivered) messages and does not require communication with the failed level 2 entity to retrieve the information.

Figure 8:
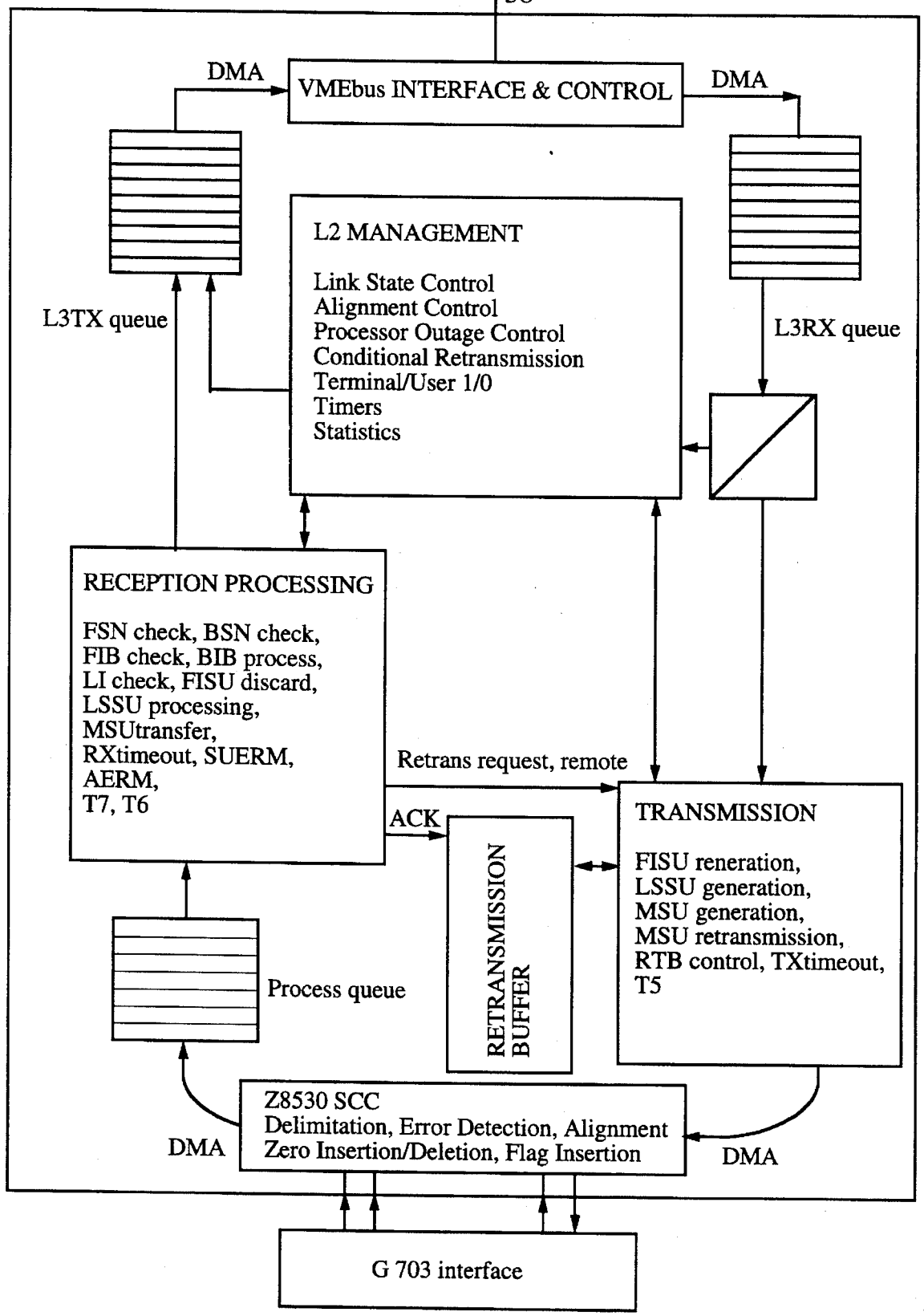
FIG. 8 illustrates in block form the level 2 subsystem.
Figure 9:
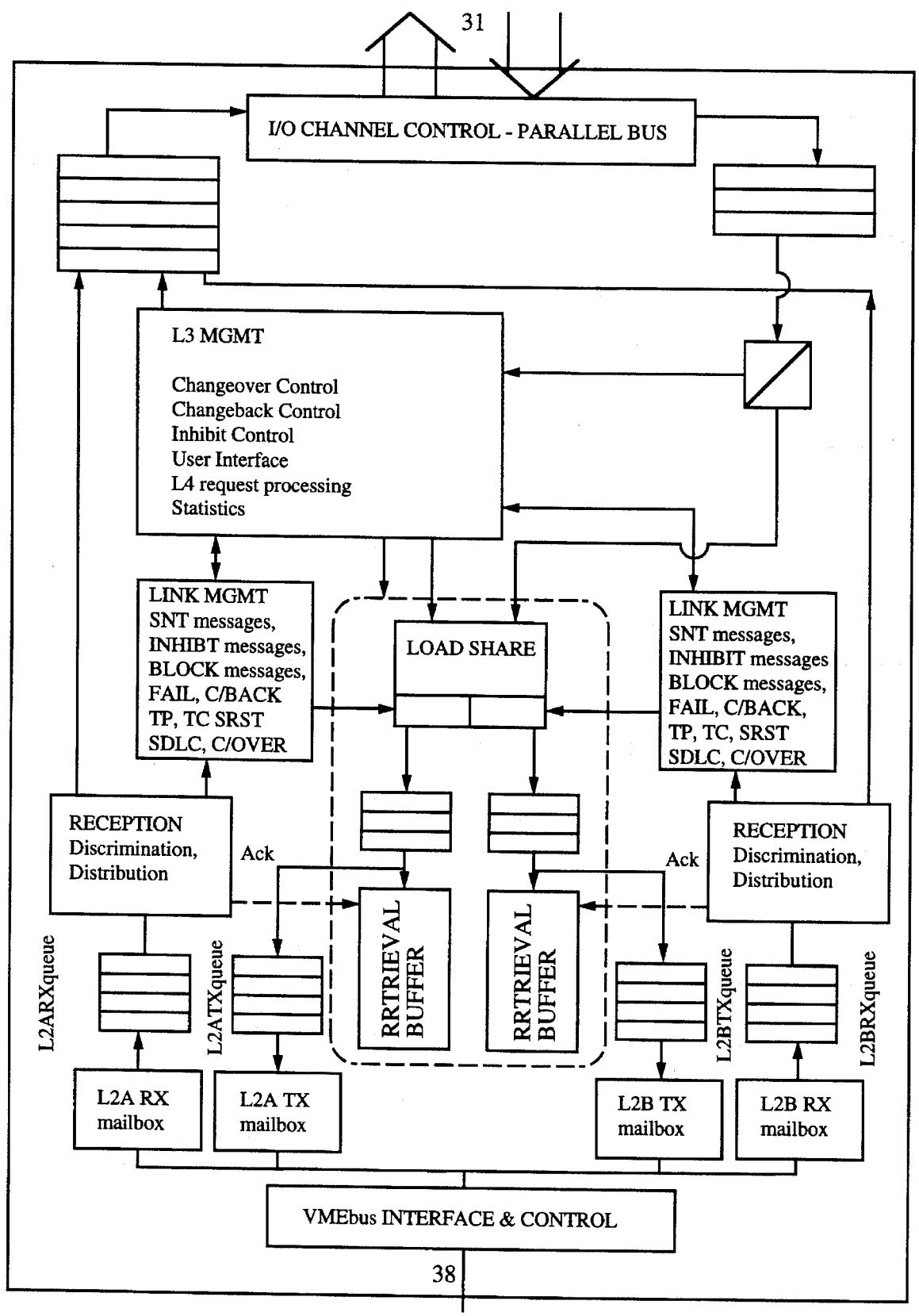
FIG. 9 illustrates in block form the level 3 subsystem.

FIGS. 8 and 9 show respectively detailed block diagrams of the level 2 and level 3 systems according to the preferred implementation of the present invention.

Figure 3:
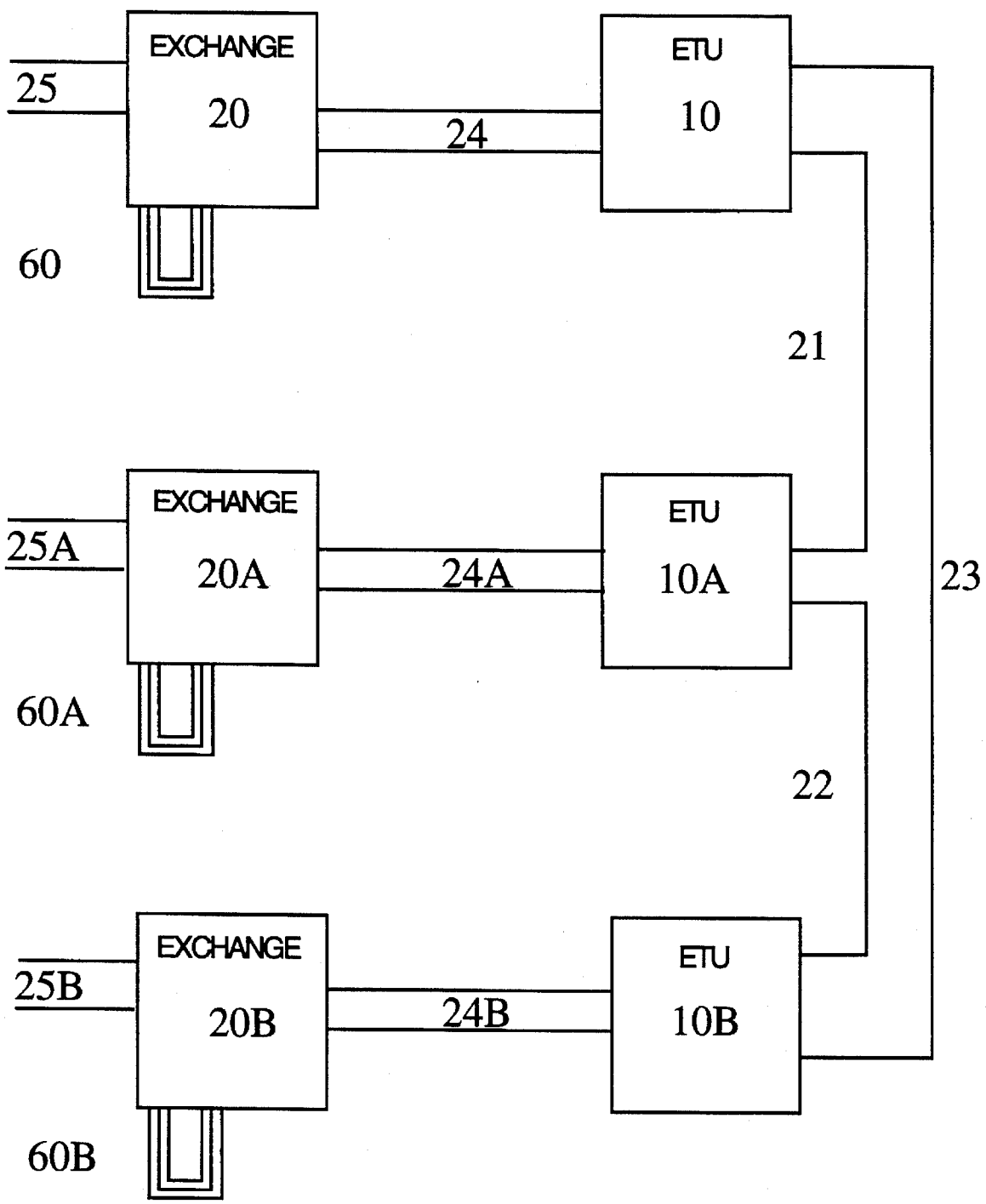
FIG. 3 illustrates in block form an enhanced telephony network according to the present invention.

FIG. 3 illustrates a situation where many exchanges 20, 20A and 20B have an associated ETU 10, 10A and 10B and are interconnected so as to form an enhanced telephony network. ETUs 10, 10A and 10B may communicate between themselves, utilising exchange facilities only where necessary. Links 21, 22, 23 between exchanges may be, for instance, x 25 or point to point links.

Figure 4:
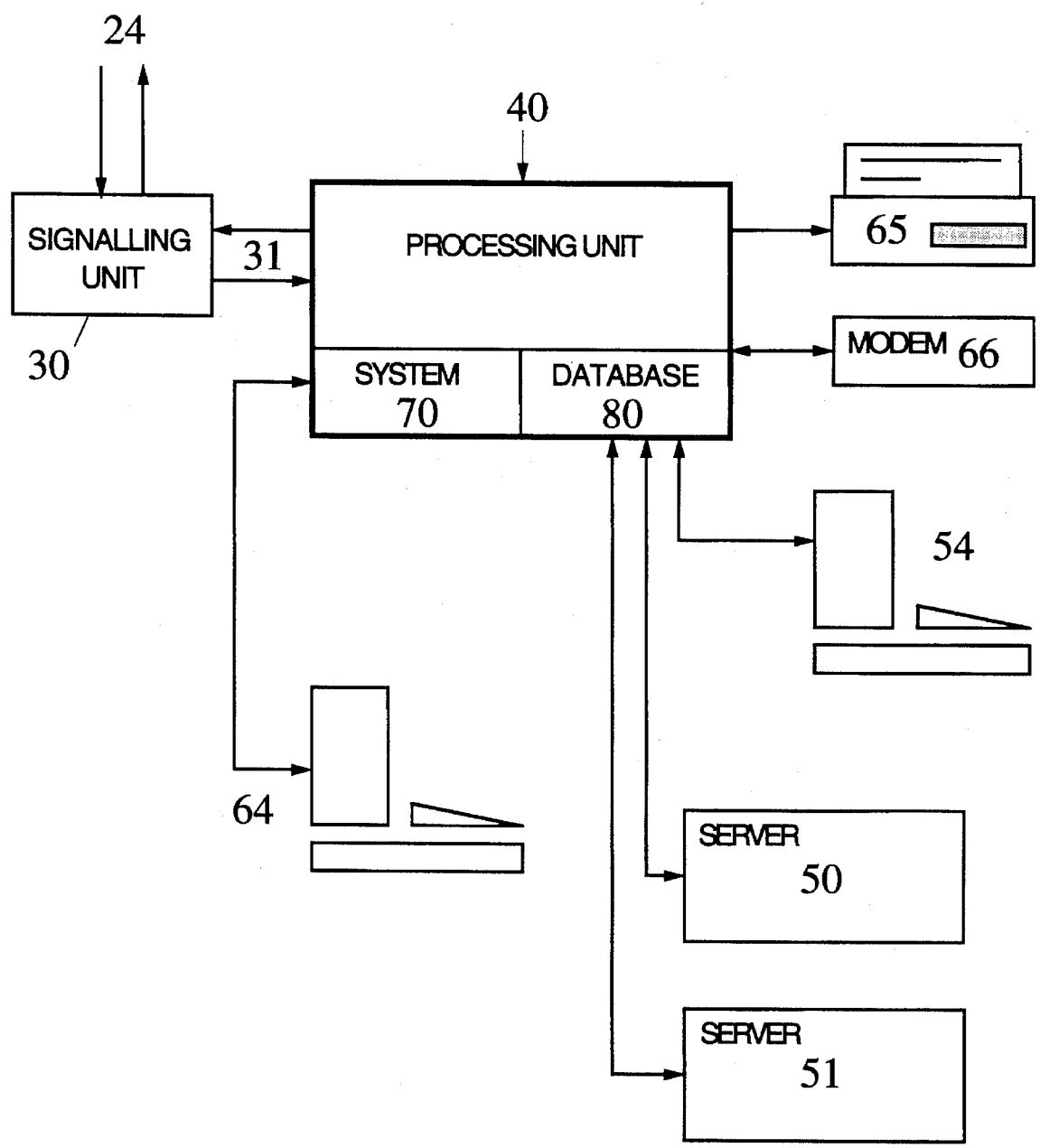
FIG. 4 illustrates in block form the hardware components comprising an illustrative apparatus.

FIG. 4 illustrates one particular structural arrangement of an ETU. It is important to note that many functions are performed using essentially conventional computer hardware configured with components to allow the ETU to communicate with exchanges. Processing unit 40 including system software 70 and database 80 communicates via parallel bus 31 with signalling unit 30. System software 70 may be accessed via console and keyboard 64. Database 80 accessed via system software 70 and terminal 54. The processing unit 40 also drives peripheral devices such as printer 65 and modems 66. Servers 50, 51 communicate with system software 70.

A further advantage of the described embodiment over conventional exchanges is that the CCSS#7 signalling protocol contains an embedded indication of customer identity. Hence, the same number may be configured to provide distinct services depending on who calls. Closed user groups and virtual private networks may be created. The identification of the caller is critical for correct billing and operation. It further allows distinction between services paid for by the call receiver, for instance call re-direction, and those paid for by the caller, for instance fax store and forward. The use of a unix-based system allows an incoming call "number" to correspond simply to a memory address, obviating the slow tree-search on each number conventionally employed by exchanges.

It should be appreciated that a wide range of services may be provided using a system as described above. Examples of services, which are not limitative or exhaustive, follow. It is particularly noted that these services can be provided to users on the PSTN, and are not limited to e.g. users of a PABX network.

Call forwarding, e.g. a call to N1 is forwarded to N2 if N1 is busy, or at certain time of the day, or for certain callers, or if N1 is unanswered.

Multicasting: a facsimile message to N1 is on-sent to n different recipients.

Conference calls: a call to N1 establishes separate calls to N2 and N3, and all parties can communicate with each other.

Abbreviated dialling or customer defined numbering.

Closed user group—only particular callers have access to each other.

Priority routing for calls, for instance a high-rate data channel or secure line, on either the PSTN or international shared carrier.

Detailed breakdown for users of call characteristics.

It should be understood that variations and modifications of the foregoing are possible without departing from the general inventive concept of this invention.

I claim:

1. An improved communications system for providing customer specified services, comprising in combination:

a telephone exchange including switching means adapted to switch calls according to a switching protocol which includes means identifying the origin of calls, said exchange including re-entrant trunks and means for communicating with other exchanges, said exchange not requiring an inherent enhanced or intelligent services capacity; and enhanced telephony means in communication with said exchange and including memory means for storing call handling instructions, processing means for performing enhanced services instructions and interfacing means in communication with said exchange, wherein said exchange communicates with said enhanced telephony means as if said enhanced telephony means is another exchange, and said enhanced telephony means is operatively enabled to re-route calls received by said exchange using said re-entrant trunks.

2. A system according to claim 1, wherein said system further includes a plurality of customer lines, connected directly or indirectly to said exchange.

3. A system according to claim 2, wherein said enhanced telephony means is enabled to re-route calls based upon said call handling instructions, said instructions being responsive to the origin of a given call.

4. A system according to claim 3, wherein said enhanced telephony unit communicates with said exchange using the CCSS#7 protocol.

5. A method for providing enhanced telephony services, in a network comprising a plurality of customer lines, at least one exchange, said exchange not requiring an inherent enhanced or intelligent services capacity, and an enhanced telephony unit connected by trunk lines to said exchange, comprising the steps of:

(a) making a first call request having a predefined number from one of said customer lines;

(b) receiving said first call request at said exchange and switching it to said enhanced telephony unit;

(c) comparing said first call request in said enhanced telephony unit with a stored table of instructions, said enhanced telephony unit causing said exchange to make at least one further call request in accordance with said instructions; and (d) providing an enhanced telephony service in respect of said first call request.

6. The method of claim 5, wherein the first call request is switched to the enhanced telephony unit via a trunk connection.

7. The method of claim 6, wherein the first call request is switched to the enhanced telephony unit using the CCSS#7 protocol.

8. The method of claim 5, wherein the enhanced telephony unit decides on the appropriate instructions based also on the identity of the one of said customer lines.

* * * * *

UNITED STATES PATENT AND TRADEMARK OFFICE
CERTIFICATE OF CORRECTION

PATENT NO. : 5,519,770
DATED : May 21, 1996
INVENTOR(S) : Calvin J. Stein

It is certified that error appears in the above-indentified patent and that said Letters Patent is hereby corrected as shown below:

Title page item [73],
  delete "Australia and Overseas Telecommunications Corporated Limited" and insert therefor --TELSTRA CORPORATION LIMITED--.

Signed and Sealed this

Seventeenth Day of September, 1996

Attest:

BRUCE LEHMAN

Attesting Officer

Commissioner of Patents and Trademarks